US006955365B2

(12) United States Patent
Giampavolo et al.

(10) Patent No.: US 6,955,365 B2
(45) Date of Patent: Oct. 18, 2005

(54) COLLAPSIBLE WHEELED SHOPPING CONTAINER

(75) Inventors: Paul Giampavolo, 9 Hasta Way, Newton, NJ (US) 07860; Robert Shelton, Princeton, MA (US)

(73) Assignee: Paul Giampavolo, Newton, NJ (US)

( * ) Notice: Subject to any disclaimer, the term of this patent is extended or adjusted under 35 U.S.C. 154(b) by 0 days.

(21) Appl. No.: 10/374,809

(22) Filed: Feb. 25, 2003

(65) Prior Publication Data

US 2004/0145158 A1 Jul. 29, 2004

Related U.S. Application Data

(60) Provisional application No. 60/359,677, filed on Feb. 26, 2002.

(51) Int. Cl.$^7$ .................................................. B62B 1/12
(52) U.S. Cl. .................... 280/47.26; 280/652; 280/651; 229/117.09
(58) Field of Search ................................ 280/651, 652, 280/654, 47.17, 47.26, 63, 79.2; 229/117.09

(56) References Cited

U.S. PATENT DOCUMENTS

| 2,371,472 | A | * | 3/1945 | Ruff et al. ................... 280/652 |
| 2,472,203 | A | * | 6/1949 | Friedmann et al. .......... 280/652 |
| 2,564,939 | A | * | 8/1951 | Weast ........................... 280/652 |
| 2,610,071 | A | * | 9/1952 | Davis et al. .................. 280/652 |
| 3,092,395 | A | * | 6/1963 | Mitty et al. .................. 280/652 |
| 3,135,527 | A | * | 6/1964 | Knapp .......................... 280/654 |
| 3,197,225 | A | * | 7/1965 | Powell .......................... 280/652 |
| 3,285,620 | A | * | 11/1966 | Mitty et al. .............. 280/47.26 |
| 3,292,942 | A | * | 12/1966 | Mitty et al. .............. 280/47.26 |
| 3,427,040 | A | * | 2/1969 | Jenkins ......................... 280/652 |
| 5,125,675 | A | * | 6/1992 | Engelbrecht ................. 280/37 |
| 5,464,237 | A | * | 11/1995 | Saporiti ........................ 280/30 |
| 5,503,417 | A | * | 4/1996 | Murphy .................... 280/79.11 |
| 6,073,943 | A | * | 6/2000 | Serrault .................... 280/47.26 |
| 6,547,263 | B1 | * | 4/2003 | McGeorge et al. ........... 280/30 |
| 2003/0011173 | A1 | * | 1/2003 | Shall ........................... 280/651 |
| 2003/0034636 | A1 | * | 2/2003 | Ng ............................... 280/652 |

* cited by examiner

*Primary Examiner*—Christopher P. Ellis
*Assistant Examiner*—Jeff Restifo
(74) *Attorney, Agent, or Firm*—Ostrolenk, Faber, Gerb & Soffen, LLP

(57) ABSTRACT

A collapsible shopping cart comprising, a container having a front portion, a rear portion and side portions connecting the front and rear portions, the side portions being foldable to allow collapsing of the container into a collapsed condition whereby the front and rear portion move closer to each other than in an uncollapsed condition, the container having a bottom portion and an open top, the bottom portion being connected by a hinge to one of the front portion and the rear portion and being pivotable about the hinge, at least one wheel being provided adjacent the bottom portion, the bottom portion being movable from a first position when the shopping cart is in the collapsed condition to a second position so as to form a bottom for the shopping cart when the shopping cart is in the uncollapsed condition.

17 Claims, 7 Drawing Sheets

COLLAPSIBLE WHEELED SHOPPING CONTAINER

CROSS REFERENCE TO RELATED APPLICATION

This application claims the benefit and priority of U.S. Provisional Application No. 60/359,677 filed Feb. 26, 2002 and entitled "COLLAPSIBLE WHEELED SHOPPING CONTAINER", and which is incorporated herein by reference.

BACKGROUND OF THE INVENTION

The present invention relates to containers, and in particular, to a collapsible wheeled container which can be used as a wheeled shopping bag for use by consumers during shopping. Ordinarily, consumers use a shopping bag which is carried and held in the hand above the ground. The ordinary shopping bag provides disadvantages, particularly in that a weighty object held in the shopping bag can be tiring to the consumer.

SUMMARY OF THE INVENTION

The present invention is directed to an improvement to shopping bags. The present invention relates to a wheeled shopping container which comprises a collapsible shopping bag or cart having wheels provided along a bottom surface. Thereby, the consumer can place objects into the wheeled shopping bag and pull it along, thereby avoiding the need to carry a shopping bag. The container according to the invention is preferably collapsible, to conserve space, and also may be disposable.

BRIEF DESCRIPTION OF THE DRAWING(S)

Turning to the drawing figures.

DETAILED DESCRIPTION OF PREFERRED EMBODIMENTS

Figure 1:
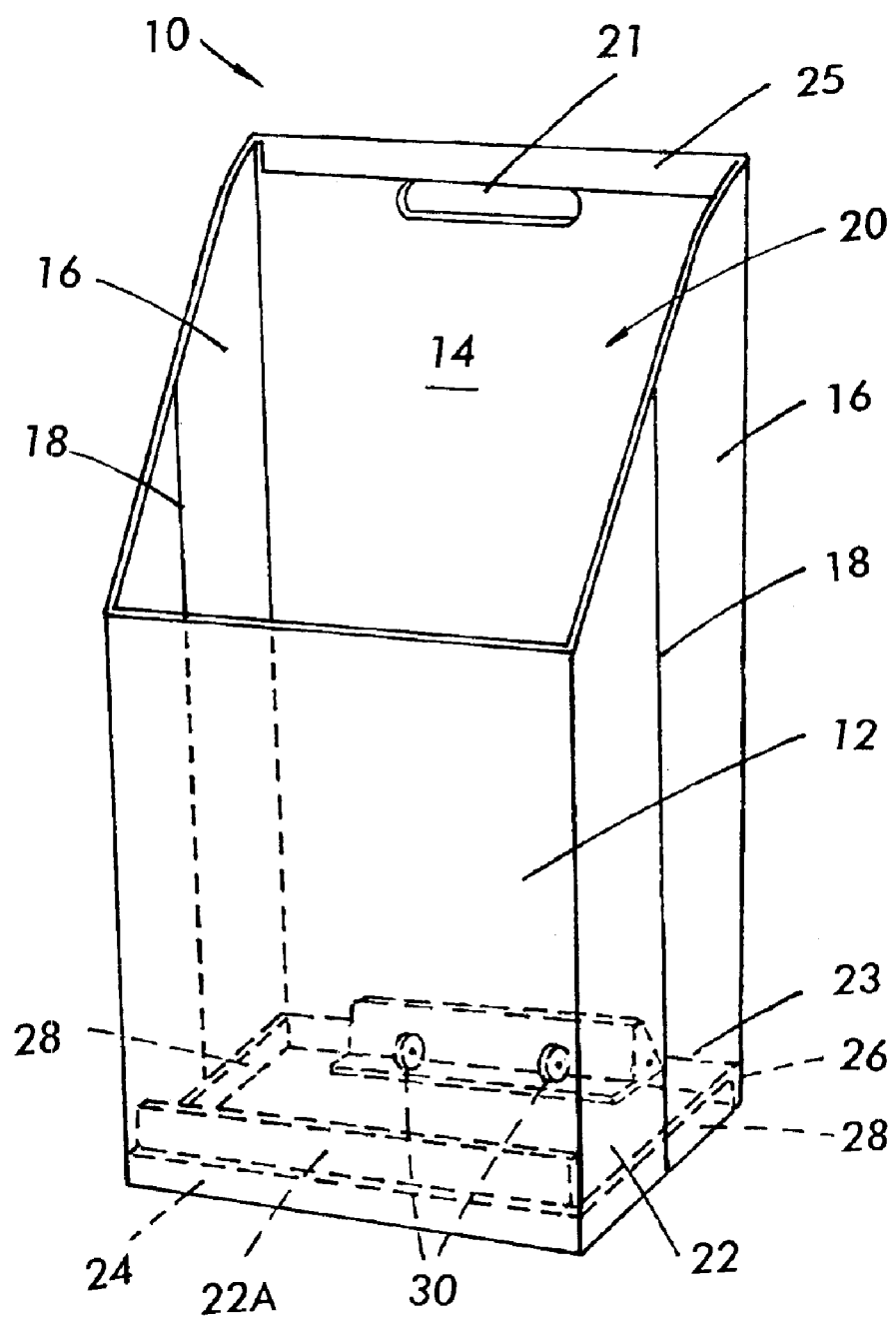
FIG. 1 shows a first perspective view of the collapsible wheeled shopping bag in its deployed state.
Figure 1A:
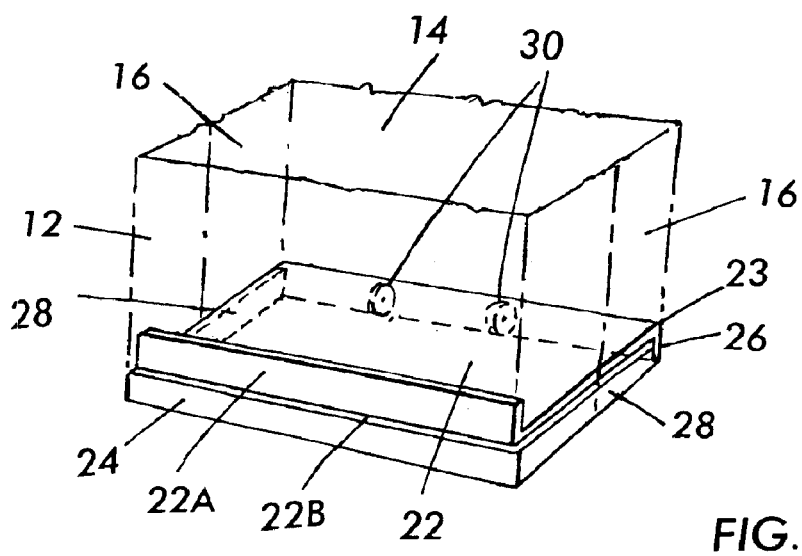
FIG. 1A is a perspective phantom view of the bottom of the shopping bag.
Figure 1B:
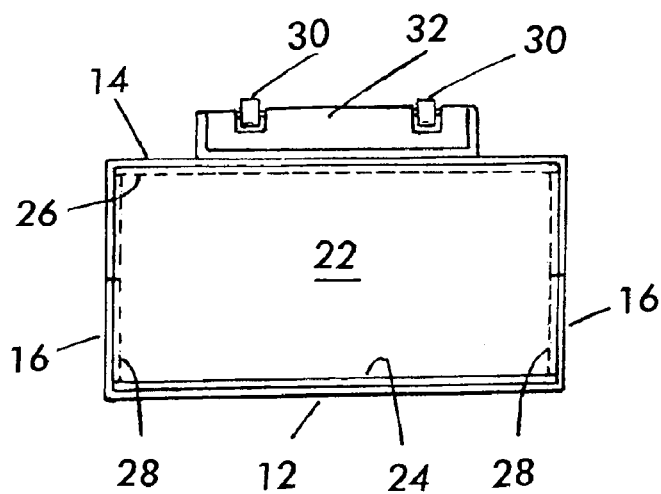
FIG. 1B is a top view of the wheeled shopping bag.
Figure 2:
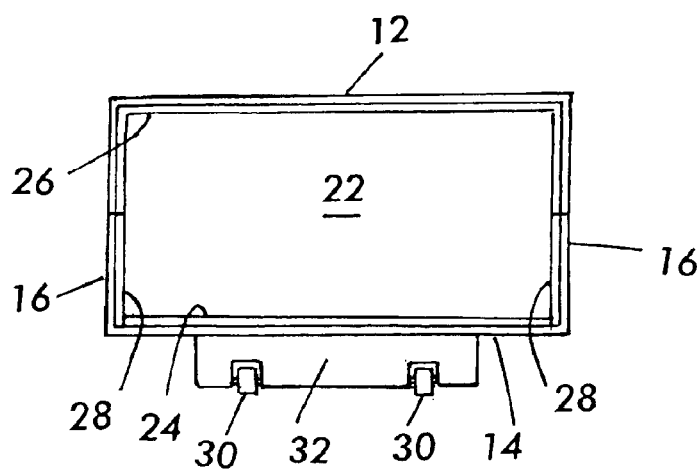
FIG. 2 is a bottom view of the wheeled shopping bag.
Figures 3, 4:
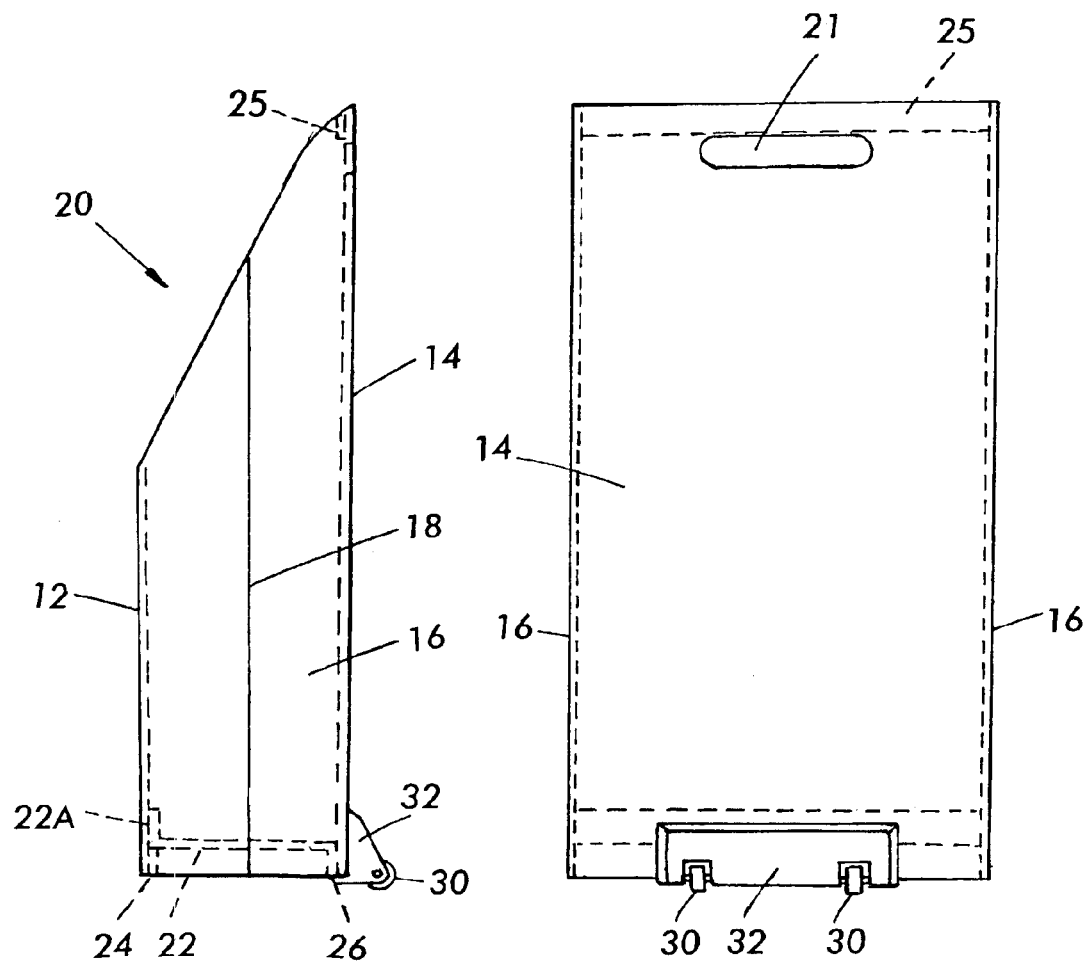
FIG. 3 is a side view.
FIG. 4 is a back view.

Turning now to the drawings, the shopping container of the present invention comprises a preferably collapsible and optionally disposable shopping container 10. The container 10 has a front portion 12, a rear portion 14 and side portions 16. The side portions 16 preferably have a foldable crease 18 therein to allow folding inwardly of the sides 16 and collapsing of the container. An opening 21 is provided as a handgrip at an upper surface. Preferably, the front portion 12 is lower than the rear portion 14 to allow lower insertion of objects through an opening 20 at the top portion of the container formed by the spacing between the front surface 12 and rear surface 14. A bottom 22 is provided, the bottom being hingedly connected to, for example, the back surface 14 along the hinge line 23. Below the bottom 22, the portions 12, 14 and 16 are provided with reinforcement strip portions 24, 26 and 28, respectively, as shown more clearly in the bottom view of FIG. 2. The portions 24, 26 and 28 are preferably strips of the same materials as the portions 12, 14 and 16 and bottom 22, and provide support (e.g., ledges) for the bottom 22 when it is in its fully deployed position. The portions 28, like the portions 16 are hinged along the line 18, thereby to allow the side wall 16, to fold inwardly to collapse the container. Strips 24, 26 and 28 further provide reinforcement of the bottom of the container 10.

As shown more clearly in FIG. 1A, FIG. 3 and FIGS. 6 and 7, the bottom 22 comprises a portion 22A which is folded along a hinge line 22B. As the bottom 22 seats against the strip portions 24, 26 and 28, which also provide reinforcement for the bottom of the container, the portion 22A is folded at a right angle to the portion 22, thereby to provide increased strength and rigidity to the bottom portion 22. See, for example, FIG. 7 which shows the bottom 22 in an almost seated position.

As shown in the figures, a reinforcement portion 25 may be provided near the top of the container to provide strengthening.

As also shown, the wheeled shopping cart includes a plurality of wheels (e.g., two wheels) 30 disposed so as to rotate in a preferably molded plastic structure 32 provided with axles for the wheels 30.

Figure 5:
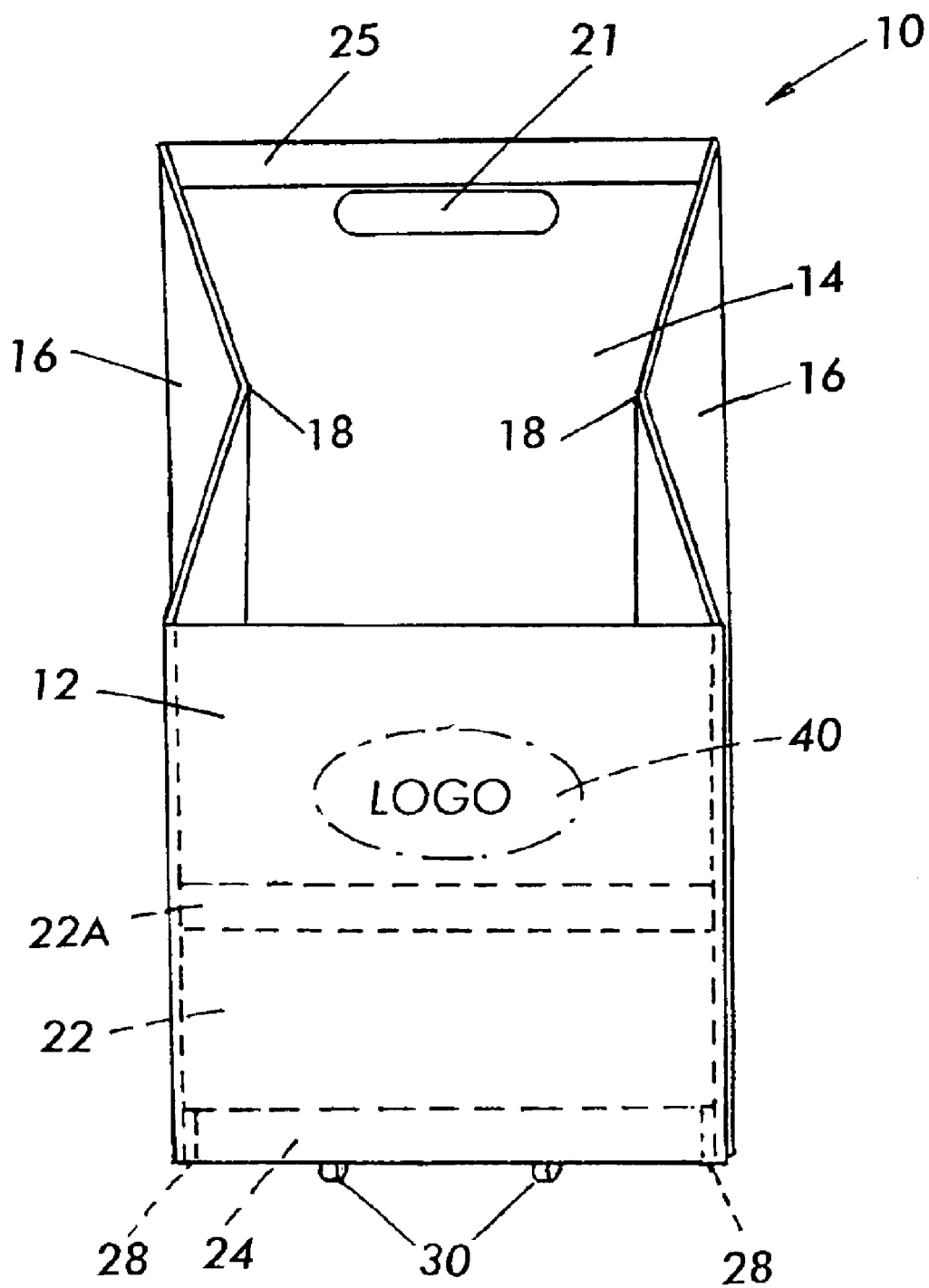
FIG. 5 is a first perspective view showing the shopping container in its fully collapsed state.
Figure 6:
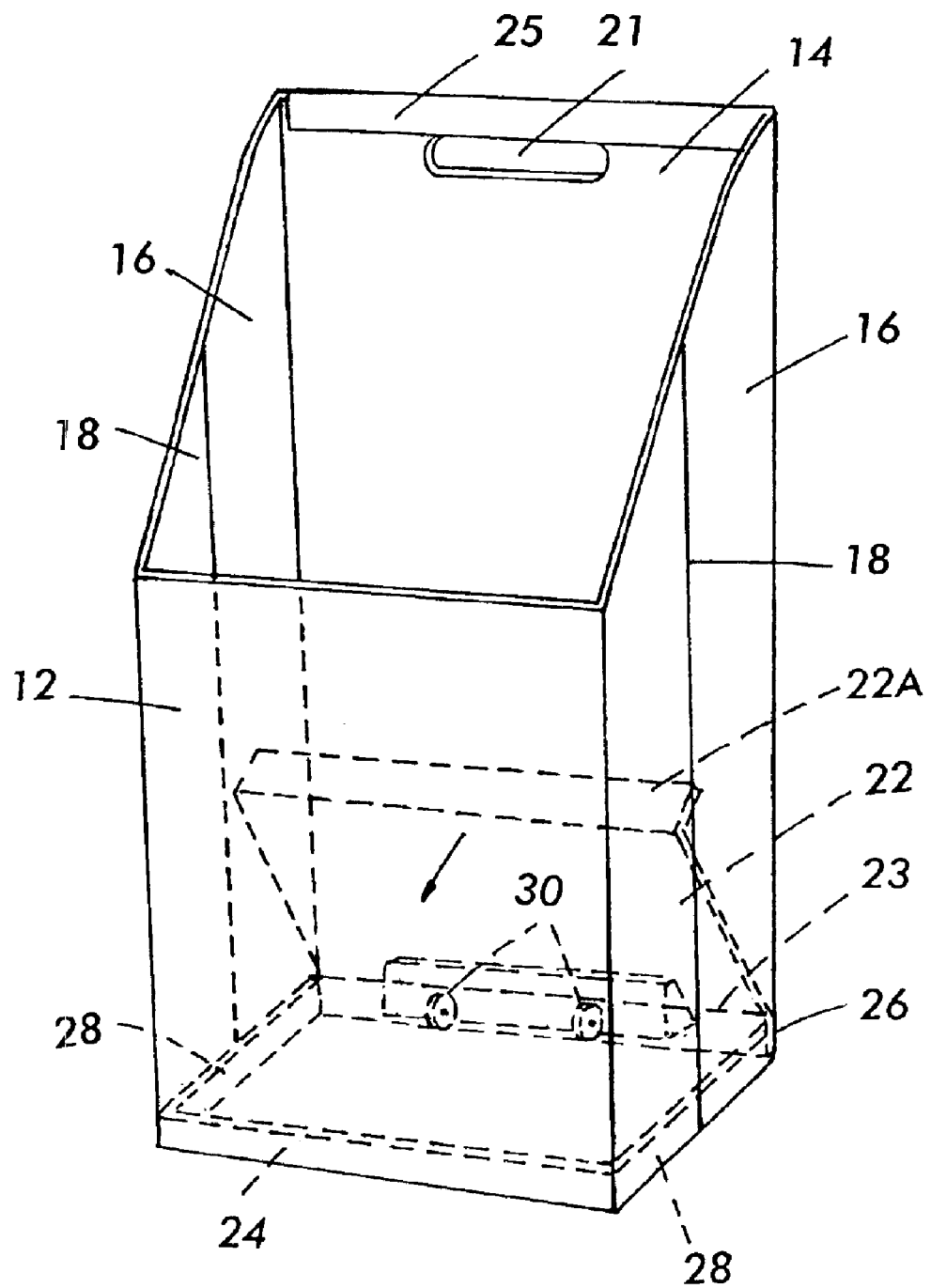
FIG. 6 shows the shopping container in the position wherein the sides have been fully deployed with the bottom in the process of being placed into its fully deployed position.
Figure 7:
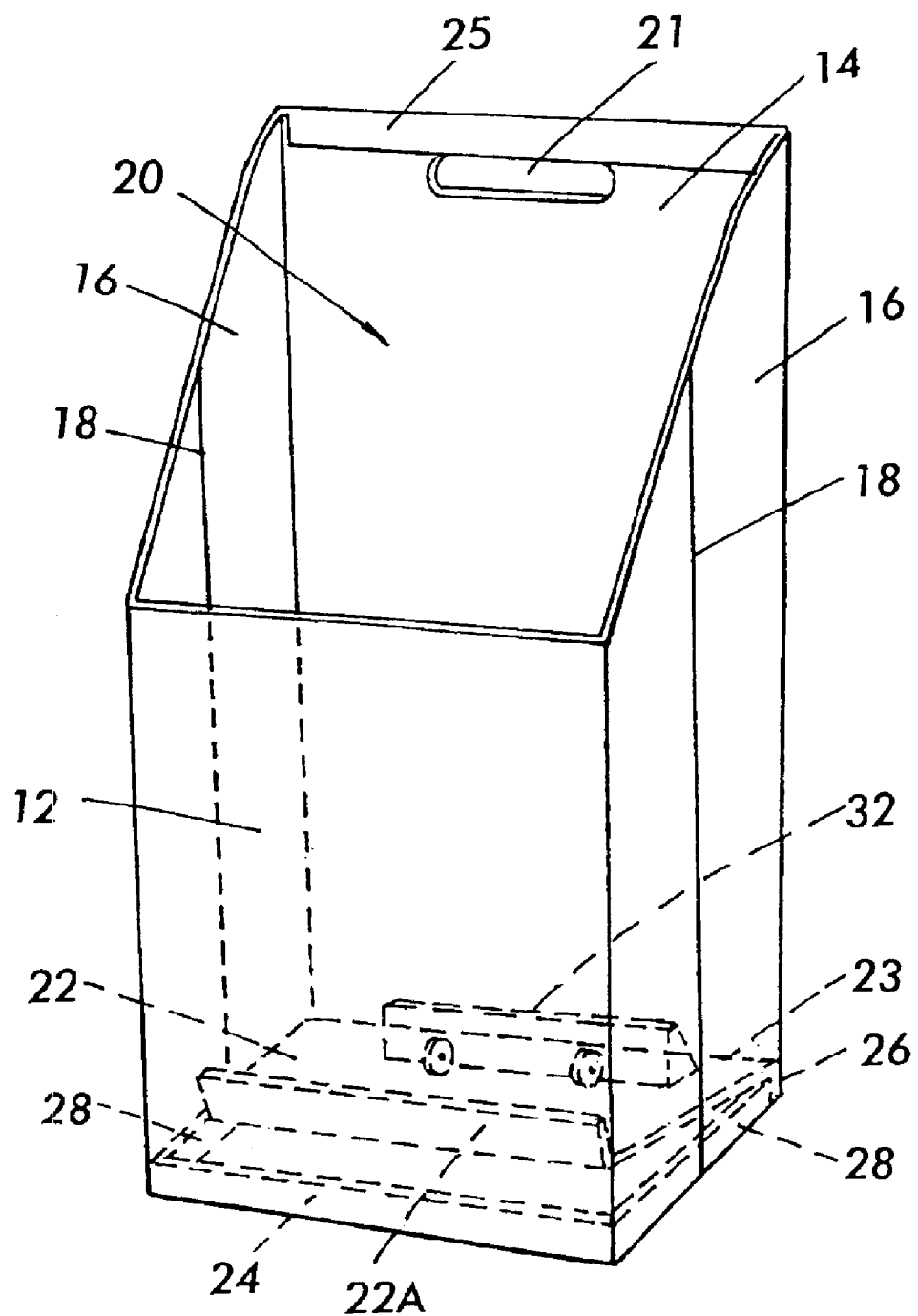
FIG. 7 shows the shopping container with the bottom nearly in its fully deployed position.

FIG. 5 shows the shopping container in its fully collapsed state. In order to collapse the shopping container, the bottom 22 is moved upwardly so that it rests against the back portion 14. This can be accomplished by either pressing the bottom portion up from its underside or by grasping the flap 22A and pulling it upwardly folding the flap 22A so that it is parallel with the portion 22 until the portion 22 and the portion 22A rest against the back portion 14. This is shown, for example, in FIG. 6 which shows the shopping container in the process of being deployed. The process is reversed to collapse the shopping container.

As shown in FIG. 5, suitable advertising images as indicated generally at 40 may be provided on the shopping container on any portion of the shopping container, particularly, the front portion 12 and/or the back portion 14.

Figure 8:
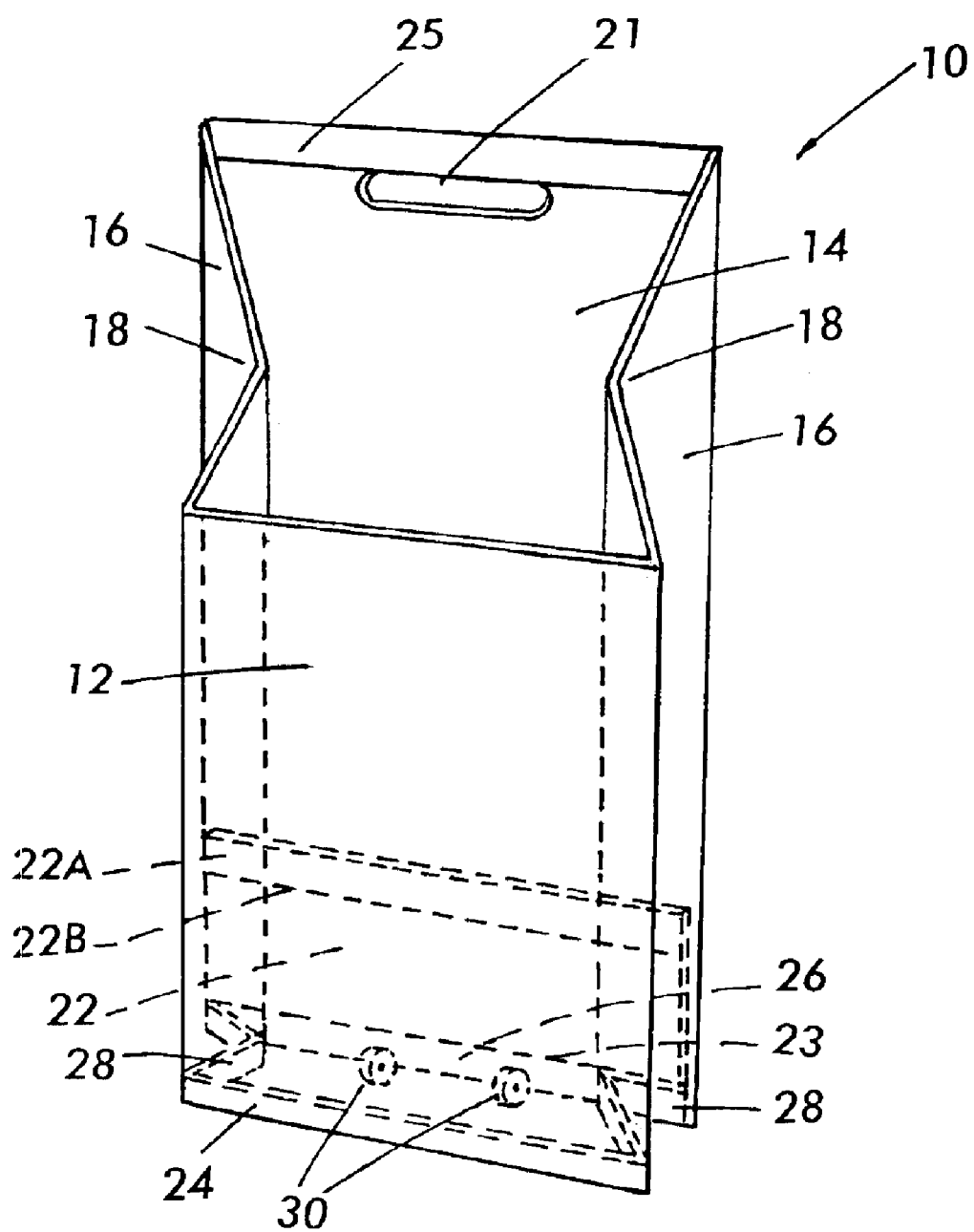
FIG. 8 shows the shopping container in a partly collapsed condition.

FIG. 8 shows the shopping container in a partially collapsed condition. As shown, the bottom portion 22 has been folded up against the back portion 14. The side portions 16 are folded inwardly along the fold lines 18 to collapse the shopping container. When deploying the shopping cart, after the side portions 16 have been fully straightened by unfolding along the fold lines 18, the bottom portion 22 is pushed downwardly until it seats on the strip portions 24, 26 and 28. Once the bottom portion 22 has been fully deployed, the shopping cart will maintain its deployed fully extended position as the bottom portion 22 maintains the side portions 16 in their unfolded condition. The strips 24, 26 and 28 as well as strips 25 can be fastened to their respective surfaces by any appropriate means, such as by fasteners, including rivets, staples, adhesive, adhesive tape, tape, etc.

The wheeled shopping container of the present invention may be made of any suitable material, for example a rigid material such as paperboard, cardboard, foam material, a suitable plastic, fiberboard, a corrugated plastic material, etc.

Although the present invention has been described in relation to particular embodiments thereof, many other variations and modifications and other uses will become apparent to those skilled in the art. Therefore, the present invention should be limited not by the specific disclosure herein, but only by the appended claims

What is claimed is:

1. A collapsible shopping cart comprising:

a container having a front portion, a rear portion and side portions connecting the front and rear portions;

the side portions being foldable to allow collapsing of the container into a collapsed condition whereby the front and rear portion move closer to each other than in an uncollapsed condition;

the container having a bottom portion and an open top, the bottom portion comprising first, second, third, and fourth edges and being connected at the first edge by a first hinge to one of the front portion, the rear portion and the side portions and being pivotable about the first hinge;

at least one flap connected to one of the second, the third, and the fourth edges of the bottom portion by a second hinge;

at least one wheel being provided adjacent the bottom portion;

the bottom portion being movable from a first position when the shopping cart is in the collapsed condition to a second position so as to form a bottom for the shopping cart when the shopping cart is in the uncollapsed condition, and wherein when the bottom portion is in the second position, the at least one flap extends perpendicularly upward with respect to the bottom portion and lies adjacent to one of the front portion, the rear portion and the side portions.

2. The collapsible shopping cart of claim 1, wherein the side portions fold inwardly toward each other to achieve the collapsed condition, with the side portions sandwiched between the front and rear portions in the collapsed condition.

3. The collapsible shopping cart of claim 1, wherein the side portions have areas to allow folding of said side portions.

4. The collapsible shopping cart of claim 1, further comprising a support for supporting the bottom portion when the bottom portion is in the second position.

5. The collapsible shopping cart of claim 4, wherein the support comprises a ledge on at least the front portion and the bottom portion is hinged to the rear portion.

6. The collapsible shopping cart of claim 5, wherein ledges are formed on the side portions for supporting the bottom portion.

7. The collapsible shopping cart of claim 6, wherein the ledges on the side portions are hinged to allow folding of the side portions.

8. The collapsible shopping cart of claim 1 wherein the front portion is shorter than the rear portion and the side portions have angled tops.

9. The collapsible shopping cart of claim 1, wherein two wheels are provided adjacent the bottom portion.

10. The collapsible shopping cart of claim 9, wherein the two wheels are affixed on axles to the rear portion.

11. The collapsible shopping cart of claim 1, wherein visual or printed matter is disposed on any of the front, rear and side portions.

12. The collapsible shopping cart of claim 1, further comprising a handle near the top of the container.

13. The collapsible shopping cart of claim 12, wherein the handle comprises an opening in the rear portion near the top of the rear portion.

14. The collapsible shopping cart of claim 1, wherein the container comprises a material comprising one of paperboard, cardboard, rigid foam material, plastic, fiber board and corrugated material.

15. The collapsible shopping cart of claim 1, further comprising reinforcing material at the top of said rear portion.

16. The collapsible shopping cart of claim 1, wherein the first hinge comprises a hinge line between the bottom portion and one of the front portion and the rear portion.

17. The collapsible shopping cart of claim 1, wherein the bottom portion is connected by the first hinge to one of the front portion and the rear portion.

* * * * *